(12) United States Patent
Satoh

(10) Patent No.: US 6,556,365 B2
(45) Date of Patent: Apr. 29, 2003

(54) STORAGE MEDIA HAVING A WIDE SERVO BAND AND HIGH DATA FORMAT EFFICIENCY AND A STORAGE USING THE SAME

(75) Inventor: Naoki Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/216,726

(22) Filed: Aug. 13, 2002

(65) Prior Publication Data

US 2002/0191318 A1 Dec. 19, 2002

Related U.S. Application Data

(63) Continuation of application No. 09/572,402, filed on May 16, 2000, now Pat. No. 6,469,853.

(30) Foreign Application Priority Data

May 18, 1999 (JP) .............................. 11-136762
Nov. 1, 1999 (JP) .............................. 11-311275

(51) Int. Cl.$^7$ ................................. G11B 5/09
(52) U.S. Cl. .................... 360/48; 360/77.8; 360/78.14; 360/49; 360/135

(58) Field of Search .................. 360/48, 49, 77.08, 360/78.14, 135, 46

(56) References Cited

U.S. PATENT DOCUMENTS

| 5,748,401 A | * | 5/1998 | Kawai ..................... 360/78.14 |
| 5,784,219 A | | 7/1998 | Genheimer |
| 5,852,523 A | * | 12/1998 | Jung ........................... 360/49 |
| 6,031,683 A | * | 2/2000 | Iverson et al. .......... 360/78.04 |
| 6,469,853 B1 | * | 10/2002 | Satoh .......................... 360/48 |

FOREIGN PATENT DOCUMENTS

| JP | 5-303834 | 11/1996 |
| JP | 10-162511 | 6/1998 |
| JP | 10-255257 | 9/1998 |
| KR | 97-67221 | 10/1997 |

\* cited by examiner

Primary Examiner—Alan T. Faber
(74) Attorney, Agent, or Firm—Antonelli, Terry, Stout & Kraus, LLP

(57) ABSTRACT

A servo control method for a storage media includes arranging a plurality of servo sectors along a circumferential direction of the disk-type storage medium without successively arranging the plurality of servo sectors in a radial direction and arranging a plurality of data sectors which are not split by the servo sectors.

15 Claims, 10 Drawing Sheets

FIG.9

|  | TypeA | TypeB1 | TypeB2 | TypeC |  |
|---|---|---|---|---|---|
| NO. OF ROTATIONS OF DISK | 10000 | 10000 | 10000 | 10000 | rpm |
| NO. OF FULL SERVO SECTORS | 80 | 160 | 80 | 40 | PER CIRCUMFERENCE |
| NO. OF NEW SHORT SERVO SECTORS | - | - | (80) | 120 | PER CIRCUMFERENCE |
| BURST CYCLE FREQUENCY | 20 | 40 | 40 | 40 | MHz |
| NO. OF SPLIT SECTORS (ASSUMPTION) | 40 | 120 | 120 | 20 | PER CIRCUMFERENCE |
| DATA TRANSFER RATE | 30 | 30 | 30 | 30 | MB/s |
| NO. OF DATA SECTORS | 260 | 252 | 257 | 265 | PER CIRCUMFERENCE |
| DATA AREA RATIO | 73.9 | 71.6 | 73.1 | 75.4 | % |
| SERVO AREA RATIO | 8.0(*1) | 8.0(*1) | 6.2(*2) | 5.3(*5) | % |
| RATIO OF AGC AND THE LIKE (*3) | 10.8 | 13.4 | 13.6 | 10.3 | % |
| RATIO OF ECC AND THE LIKE (*4) | 6.9 | 6.7 | 6.9 | 7.1 | % |
|  | NARROW SERVO BAND | NARROW SERVO BAND | SERVO BAND UP | SERVO BAND UP |  |

*1: SHORT FORMAT NOT APPLIED
*2: SHORT-FORMAT SERVO SECTORS USED FOR 1/2 (80 SERVO SECTORS) OF ALL SERVO SECTORS
*3: AGC AND THE LIKE:PLO+ISG1+SYNC+PAD+ISG2=65(Bytes)
*4: ECC AND THE LIKE:ECC+LBA+CRC=48(Bytes)
*5: SHORT-FORMAT SERVO SECTORS USED AT AN INTERVAL OF TWO DATA SECTORS

FIG.10

| SERVO SECTOR | | | |
|---|---|---|---|
| FULL FORMAT | | SHORT FORMAT | |
| POSITION | CYCLES | POSITION | CYCLES |
| AGC/PLL | 40 | PESA | 16.5 |
| AM | 8 | PESB | 16.5 |
| SSA | 8 | PRSC | 16.5 |
| TID | 16 | PESD | 16.5 |
| PESA | 12 | | |
| PESB | 12 | | |
| PESC | 12 | | |
| PESD | 12 | | |
| | TOTAL: 120 | | TOTAL: 66 |

FIG.11

| NON-SPLIT SECTOR | | SPLIT SECTOR | | | |
|---|---|---|---|---|---|
| | | FRONT SECTOR | | BACK SECTOR | |
| POSITION | (Bytes) | POSITION | (Bytes) | FIELD | (Bytes) |
| ISG1 | 15 | ISG1 | 15 | ISG1 | 15 |
| AGC | 25 | AGC | 25 | AGC | 25 |
| SYNC | 6 | SYNC | 6 | SYNC | 6 |
| LBA | 4 | LBA | 4 | DATA | 512-n |
| DATA | 512 | DATA | n | CRC | 4 |
| CRC | 4 | PAD | 4 | ECC | 40 |
| ECC | 40 | ISG2 | 15 | PAD | 4 |
| PAD | 4 | | | ISG2 | 15 |
| ISG2 | 15 | | | | |
| TOTAL: 625 | | | | TOTAL: 690 | |

FIG.12

|  | TypeA | TypeB1 | TypeB2 |  |
|---|---|---|---|---|
| NO. OF ROTATIONS OF DISK | 10000 | 10000 | 10000 | rpm |
| NO. OF FULL SERVO SECTORS | 80 | 160 | 80+80 | PER CIRCUMFERENCE |
| BURST CYCLE FREQUENCY | 20 | 40 | 40 | MHz |
| NO. OF SPLIT SECTORS (ASSUMPTION) | 40 | 120 | 120 | PER CIRCUMFERENCE |
| DATA TRANSFER RATE | 30 | 30 | 30 | MB/s |
| NO. OF DATA SECTORS | 260 | 252 | 257 | PER CIRCUMFERENCE |
| DATA AREA RATIO | 73.9 | 71.6 | 73.1 | % |
| SERVO AREA RATIO | 8.0(*1) | 8.0(*1) | 6.2(*2) | % |
| RATIO OF PLO AND THE LIKE (*3) | 10.8 | 13.4 | 13.6 | % |
| RATIO OF ECC AND THE LIKE (*4) | 6.9 | 6.7 | 6.9 | % |
|  | NARROW SERVO BAND |  | SERVO BAND UP |  |

*1: SHORT FORMAT NOT APPLIED
*2: SHORT-FORMAT SERVO SECTORS USED FOR 1/2 (80 SERVO SECTORS) OF ALL SERVO SECTORS
*3: PLO AND THE LIKE:PLO+ISG1+SYNC+PAD+ISG2=65(Bytes)
*4: ECC AND THE LIKE:ECC+LBA+CRC=48(Bytes)

STORAGE MEDIA HAVING A WIDE SERVO BAND AND HIGH DATA FORMAT EFFICIENCY AND A STORAGE USING THE SAME

CROSS REFERENCE TO RELATED APPLICATION

This is a continuation of U.S. application Ser. No. 09/572,402 filed May 16, 2000, now U.S. Pat. No. 6,469,853, the subject matter of which is incorporated by reference herein.

BACKGROUND OF THE INVENTION

The present invention relates to a servo format and a data format for a magnetic disk and a magnetic disk device having a wide tracking servo band and high head positioning performance.

FIG. 4 shows an example of constitution of a magnetic disk device (HDD) 100. HDD 100 includes a head disk assembly (HDA) 200 including a magnetic disk 2, a magnetic head 1, a carriage 3, a read/write integrated circuit (R/W IC) 4 attached onto carriage 3, and a motor 5 and a package board (PCB) 300 including a read channel 31, a hard disk controller chip (HDC) 32, a servo control circuit (SC) 33, a microprocessor (MP) 34, a read-only memory (ROM) 36, and a random access memory (RAM) 37.

HDD 100 incorporated in a redundant arrays of independent disk (RAID) system or the like needs, in addition to a high-speed transfer rate and a large capacity, strength against external disturbance such as vibration for the following reasons. Many drives (HDDs) are disposed in a housing of the RAID system and operate at the same time and hence cause vibration stronger than that caused by operation of a single HDD. Therefore, to endure the environment, it is required to employ a positioning system which is strong again external disturbance of vibration.

FIG. 5 shows a layout of a servo area 27 and a data area 28 on magnetic disk 2. The areas are subdivided into a plurality of data zones 29 in a direction from an inner circumference to an outer circumference, and each zone has a data transfer rate. In this situation, to dispose a positioning system which is strong against external disturbance primarily of vibration, it is necessary to decrease the servo sample period and to improve the servo control band. A wide tracking servo band is guaranteed by increasing the number of servo sectors per disk circumference as shown in FIG. 12, which will be described later. FIG. 5 shows an example of construction in which the number of servo sectors is 32.

In a 3.5 inch HDD of 7200 rotations per minute (rpm) to 10000 rpm for the recent RAID system, the number of servo areas 27 can be increased and the servo sample period is reduced by minimizing the length of each servo area 27 per disk. In other words, this is because the physical length of the servo area can be reduced to about one half of the original length by changing the burst cycle frequency to a high value, i.e., from 20 MHz to 40 MHz as shown in FIG. 12, which will be described later.

This can be achieved primarily by a signal of a higher frequency (to be referred to as a servo frequency herebelow) for one bit of a servo signal (corresponding to one cycle of a signal in a position error signal (PES)). In the past several years, the servo frequency of the HDD for RAID has rapidly increased from about 10 MHz to a range from about 20 MHz to about 30 MHz, and the number of servo areas per circumference of a magnetic disk has increased from about 50/circumference to about 100/circumference. This has improved the servo band from about 400 Hz to about 800 Hz.

The total length of servo areas 27 in the circumferential direction little changes since the increase in the servo frequency is nearly of the same magnitude as that in the number of servo areas. Consequently, the ratio of allocation of data area 28 is kept unchanged. However, as shown in FIG. 6, as the number of servo areas increases, the chance in which a data sector is split (to be referred to as a split sector 25) in data area 28 becomes greater. This increases additional areas (shade areas in FIG. 6) such as AGC (automatic gain control (AGC)/phase locked loop (PLL) acquisition area) 17 of the data sector, and hence the data formatting efficiency is reduced.

FIG. 6 shows in its upper section a reproduced waveform 6 of a servo sector of a full format (the servo sector in this case is a zone corresponding to each servo area 27 drawn with a bold line in the radial direction in FIG. 5). Full-format servo sector 6 includes an AGC/PLL acquisition area (AGC/PLL) 7, a servo address mark area (AM) 8, a servo sector address area (SSA) 9-1, a track ID area (TID) 9-2, and position error signal areas (PESA to PESD) 10 to 13. This configuration includes PESA to PESD, for example, a signal of a fixed frequency is recorded at different positions in the tracking direction for A to D. Even two kinds thereof such as A and B can achieve the tracking control function.

These areas are arranged on magnetic disk 2 in its circumferential direction with an equal interval therebetween. The areas are discriminated from data to be demodulated according to a servo gate (SGATE) 14. Data sectors 25 and 26 are formatted in areas other than servo area 27. If the interval of SGATE 14 is sufficiently large, only a few data sectors are divided by a servo area at an intermediate point thereof as can be seen from a non-split sector 26, and hence no problem occurs. However, when the interval of SGATE 14 becomes smaller, the number of split sectors 25 divided by a servo area at an intermediate point thereof increases.

Non-split sector 26 includes fields of time (ISG1/2) 16 and 22 necessary for the rise and fall time of a read/write circuit system or the like and for absorption of fluctuation in rotation of magnetic disk 2, AGC 17 necessary to acquire AGC/PLL, SYNC 18 indicating a start point of data, encoded data (DATA), a cyclic check code (CRC) 23, an error correction code (ECC) 24, and PAD 21 necessary to determine data and to absorb a read delay of a read/write channel. However, since split sector 25 needs ISG1/2, AGC, SYNC, and PAD in duplication as indicated by shades, data area 28 is reduced.

One solution of this problem is to increase the servo frequency of servo area 27. Namely, by minimizing the physical length of the servo area, data area 28 itself is further enlarged. This idea is implemented in a method which, as disclosed in U.S. Pat. No. 5,784,219 (as shown in FIG. 7), employs a mixed configuration of servo sectors of full format 6 and short format 6-1. Short-format servo sector 6-1 is disposed between full-format servo sectors 6 to remove from short-format sector 6-1 the AGC/PLL, AM, SSA, and TID fields of the full format, namely, only PES is used. Since full-format servo sector 6 and short-format sector 6-1 appear alternately, the difference in format can be discriminated. The prior art shown in FIG. 7 as a configuration of the alternating arrangement of the full format and the short format of servo sectors. However, consideration has not been given at all to a relationship between this arrangement and the data split.

FIG. 10 shows a configuration example of servo sectors of the prior art. Full-format servo sector 6 of FIG. 6 includes AGC/PLL, AM, SSA, TID, and PESA to PESD respectively having lengths of 40, 8, 8, 16, and 12×4 cycles, and hence the total length is 120 cycles as shown in FIG. 10. Short-format servo sector 6-1 includes PESA to PESD each having a length of 16.5×4 cycles and the total length is 66 cycles. The PES length is elongated (from 12 cycles to 16.5 cycles) in consideration of fluctuation in the disk rotation and the like. The gain of AGC acquired in the preceding full format area is used for short format 6-1. Since synchronization of PLL is not required to demodulate PES of short format 6-1, AGC/PLL area 7 can be dispensed with.

By opening SGATE 14-1 for the short format using as a mark the AM position detected in the preceding full format area, SSA 9-1 and TID 9-2 can also be deleted for the short format 6-1. In this operation, only full-format servo sector 6 is decoded in the seek operation of the head, and short-format servo sector 6-1 is demodulated only in the following operation (in a state in which the head position is held at a predetermined track position). All of four PES information items of PESA to PESD of short format 6-1 are not necessary, and it is assumed that even two information items, i.e., PESA and PESB can cope with the operation in principle.

FIG. 11 shows formats of data sectors 25 and 26 in this case. Non-split sector 26 not split by a servo sector is 625 byte long, and split sector 25 split by a servo sector into a front field 25-1 and a back field 25-2 and has a total length of 690 bytes.

For the servo/data formats of FIGS. 10 and 11, the data area ratio (format efficiency) of a 10000 rpm HDD is calculated by changing the number of servo sectors and the burst cycle frequency (servo frequency). The data transfer rate is kept fixed as 30 MB/s. FIG. 12 shows results of the calculation.

The results of calculation of FIG. 12 are grounded as follows. Data sectors can be allocated to an area obtained by subtracting the servo area from an area corresponding to six milliseconds (msec) of one circumference. The number of non-split sectors can be calculated by subtracting the total split data sector length from the area. This leads to the total number of data sectors on the circumference of the magnetic disk. The data area ratio is calculated as a ratio of the area length determined by "512-byte long user data×total number of data sectors" to the length in the circumferential direction. The ratio of AGC or the like is calculated as a ratio of 65×2=130 bytes for a split sector and 65 bytes for a non-split sector to the length in the circumferential direction. The ratio of ECC or the like is calculated as a ratio of "total number of data sectors×48 bytes" to the length in the circumferential direction.

In FIG. 12, Type A is an HDD having a relatively narrow servo band in which the servo frequency is 20 MHz when the number of servo sectors is 80. It is assumed in this case that the number of split data sectors is 40 corresponding to about 50% of the number of servo sectors. Since the total number of data sectors is 260, the format efficiency (data area ratio) can be calculated as about 73.9%.

Type B1 is an HDD with an increased servo band with the servo area ratio kept unchanged. The number of servo sectors is increased to 160 and the servo frequency is increased to 40 MHz. Since the number of servo sectors is 160 and type A has 260 sectors, it is assumed that the number of split data sectors in this case is increased to 120 which is about 75% of the servo sectors. The increase in the split data sectors causes the area ratio of AGC or the like to be increased by 2.6 points from 10.8% to 13.4%. Therefore, the format efficiency (data area ratio) is decreased by 2.3 point to about 71.6%.

Type B2 shows a case of an application of U.S. Pat. No. 5,784,219 in which 50% of the 160 servo sectors of Type B are short-format servo sectors. Since the servo area ratio is improved by 1.8 points from 8% to 6.2%, the format efficiency is improved by about 1.5 points to about 73.1%. However, when compared with Type A of a narrow servo band (with a smaller number of servo sectors per disk circumference), the lowering of the format efficiency cannot be avoided.

As above, although a little improvement can be attained by combining short-format servo sectors of the prior art, the increase in the ratio of AGC or the like caused by the split data sectors is large as 2.6 points to 2.8 points. Therefore, it is unavoidable that the format efficiency is lowered by the increase in the servo band

SUMMARY OF THE INVENTION

To solve the problem above, the present invention primarily adopts constitution as follows.

In a magnetic disk including a plurality of servo sectors and data sectors which are divided along a circumferential direction, there are included servo sectors of a full format which are successively arranged in a radial direction of a magnetic disk and which include track information and servo sectors of a short format which are arranged between the full-format servo sectors, which are not successively arranged in a radial direction of the magnetic disk, and which include position error signals. The servo sector of the short format does not split a data sector.

In the magnetic disk, the short-format server sectors include a plurality of servo formats having different recording lengths.

The magnetic disk includes a gap of at least one track between data zones obtained by dividing an area of the magnetic disk from an inner circumference to an outer circumference thereof.

In a magnetic disk including a plurality of servo sectors and data sectors which are divided along a circumferential direction, a disk area is subdivided in a direction from an inner circumference to an outer circumference of the magnetic disk into a plurality of data zones each having one data transfer rate. There are disposed servo sectors of a full format which are successively arranged in a radial direction of a magnetic disk and which include track information and servo sectors of a short format which are arranged between the full-format servo sectors and which include position error signals. The servo sectors of the short format are not successively arranged in the radial direction between adjacent data zones.

In a magnetic disk device including a head disk assembly, a read/write channel, a hard disk controller, a servo control section, and a microprocessor, only full-format servo sectors which are successively arranged in a radial direction of the magnetic disk and which include track information are decoded during a seek operation and short-format servo sectors which are arranged between the full-format servo sectors, which are not successively arranged in a radial direction of the magnetic disk, and which include position error signals are demodulated during a following operation.

Full-format servo sectors which include track information are recorded to be successively arranged in a radial direction of a magnetic disk and short-format servo sectors including position error signals are recorded between the full-format servo sectors not to be successively arranged in a radial direction of the magnetic disk.

In a magnetic disk device including a head disk assembly, a read/write channel, a hard disk controller, a servo control section, and a microprocessor, there are included a signal processing circuit which decodes servo sectors of a full format which are successively arranged in a radial direction of a magnetic disk and which include track information which includes one input of a servo control signal indicating a servo sector. The signal processing circuit includes full-format sector detecting means for detecting from the full-format servo sector that the sector is a servo sector of full format and area creating means for constructing an area to detect from a result of the detection of the full-format servo sector a short-format servo sector including position error signals. A servo control signal inputted during an output operation of the area creating means is recognized as an indication of a short-format servo sector.

BRIEF DESCRIPTION OF THE DRAWINGS

The objects and features of the present invention will become more apparent from the consideration of the following detailed description taken in conjunction with the accompanying drawings in which:

FIG. 9 is a diagram for explaining improvement of the format efficiency when the present invention is applied;

FIG. 10 is a diagram showing the length of the servo sector configuration;

FIG. 11 is a diagram showing the length of the data sector configuration; and

FIG. 12 is a diagram for explaining a state of the format efficiency in accordance with the prior art.

DESCRIPTION OF THE EMBODIMENTS

Referring mainly FIGS. 1, 2, 3, 8, and 9, description will be now given of a technique regarding a servo format and a data format which have a wider servo band and high data format efficiency in accordance with embodiments of the present invention.

Figure 1:
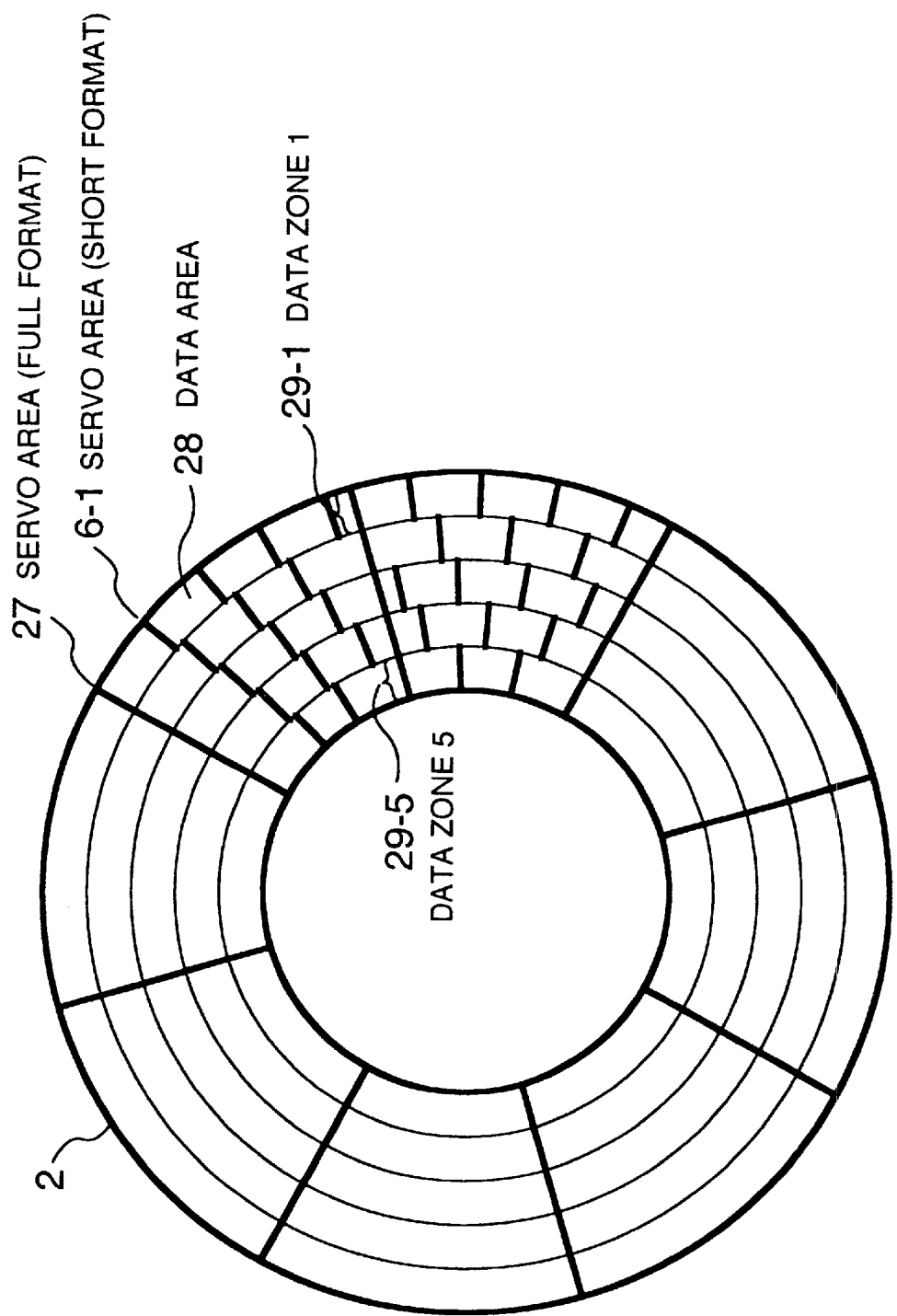
FIG. 1 is a diagram showing a layout of an embodiment of a magnetic disk in accordance with the present invention.
Figure 6:
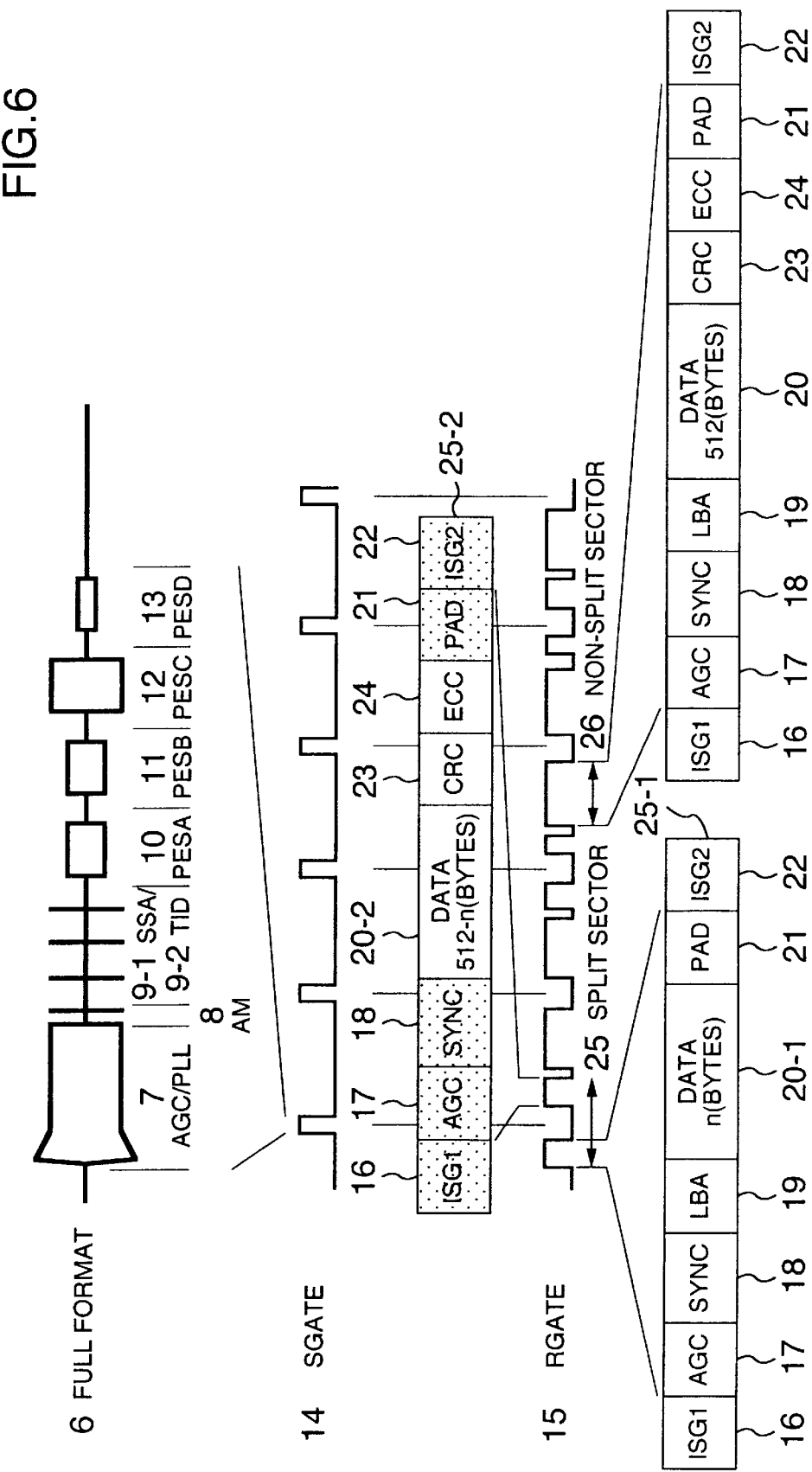
FIG. 6 is a diagram showing details of a servo format and a data format of the prior art.
Figure 7:
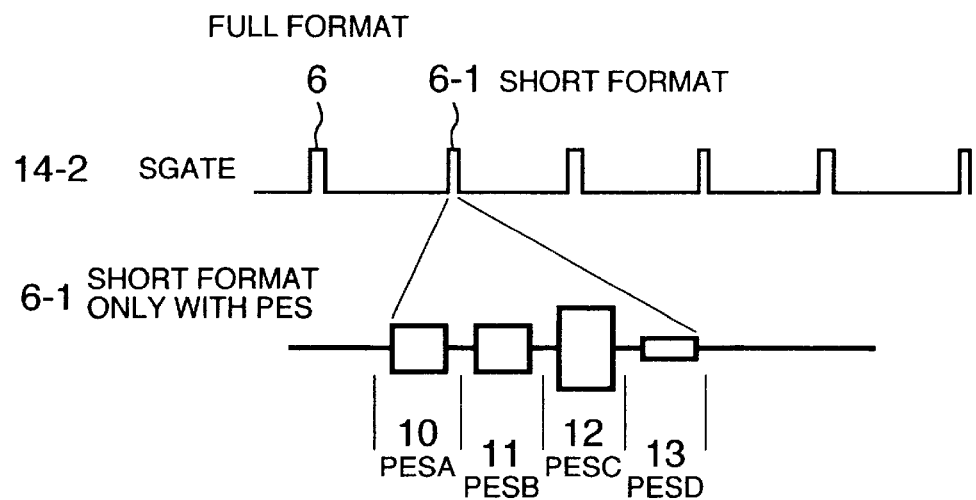
FIG. 7 is a diagram showing details of a short format of servo sectors of the prior art.

FIG. 1 shows servo and data formats in accordance with an embodiment of the present invention. The formats include full-format servo areas 27 successively arranged in a radial direction of a magnetic disk 2 and short-format servo areas 6-1 separated by a data zone in a radial direction. Servo sectors of full format 6 and short format 6-1 have the same detailed configuration as shown in FIGS. 6 and 7 described in conduction with the prior art.

Although FIG. 1 includes eight full-format servo sectors in a circumference and five data zones in a radial direction for simplification of explanation, there are actually included 80 full-format servo sectors in a circumference and 16 data zones in a radial direction.

Additionally, although full-format servo sectors 6 exist along a radial line from a center of magnetic disk 2 in the diagram, these sectors are actually arranged in a contour of an arc in a radial direction to trace a locus of a head in a head seek operation.

In this embodiment, each of the data zones 29-1 to 29-5 is allocated such that a data sector may be split by full-format servo sector 6, but is not split by short-format servo sector 6-1. Therefore, between adjacent data zones having different data transfer rates, short-format servo sector 6-1 is different in position and is not successive (is separated) at a boundary of data zone 29. In consequence, a gap of at least one track is disposed between data zones to avoid interference between short servo sector 6-1 and data sectors 25 and 26 between adjacent zones.

Figure 2:
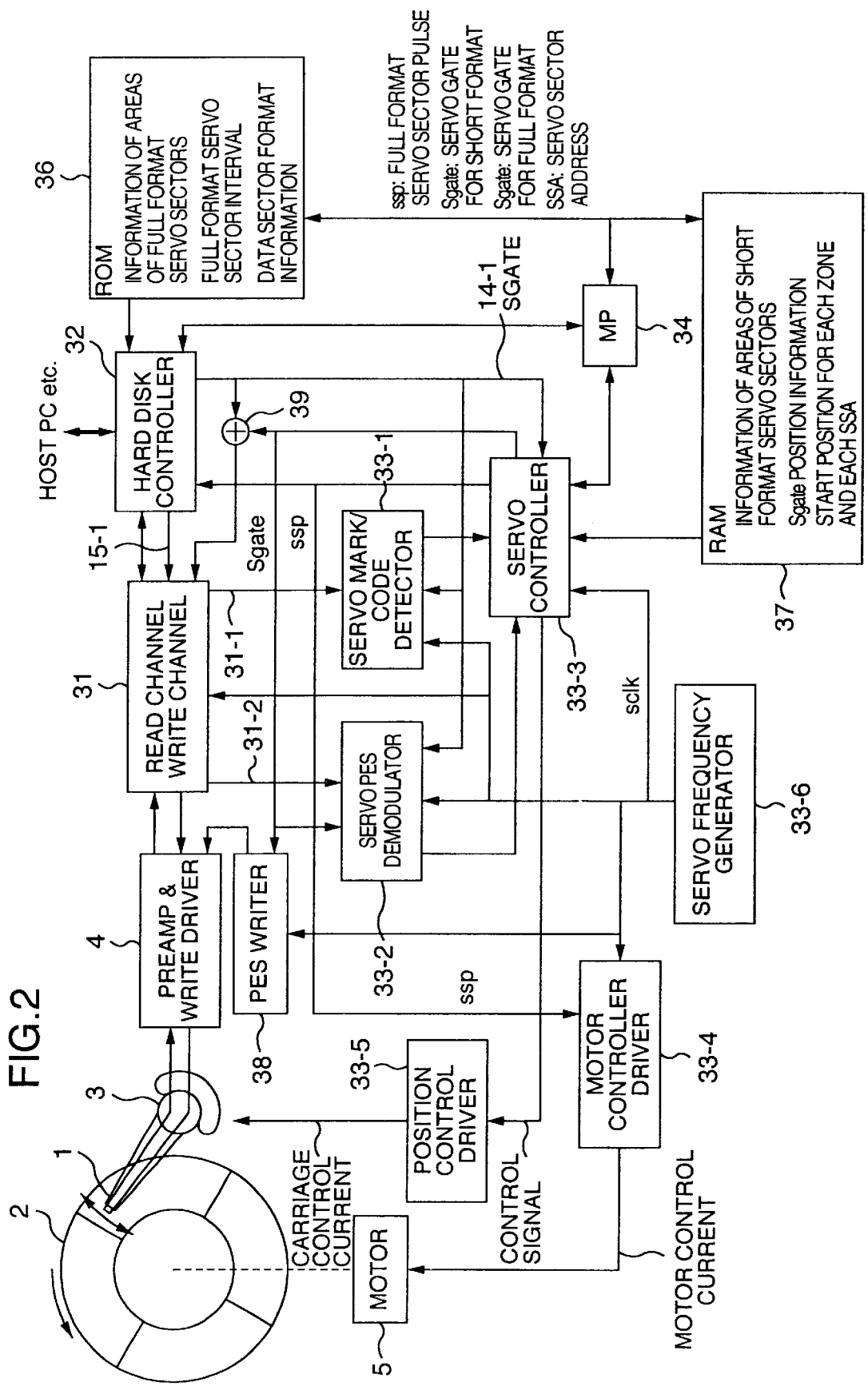
FIG. 2 is a block diagram showing an embodiment of a servo decoder circuit system in accordance with the present invention.
Figure 3:
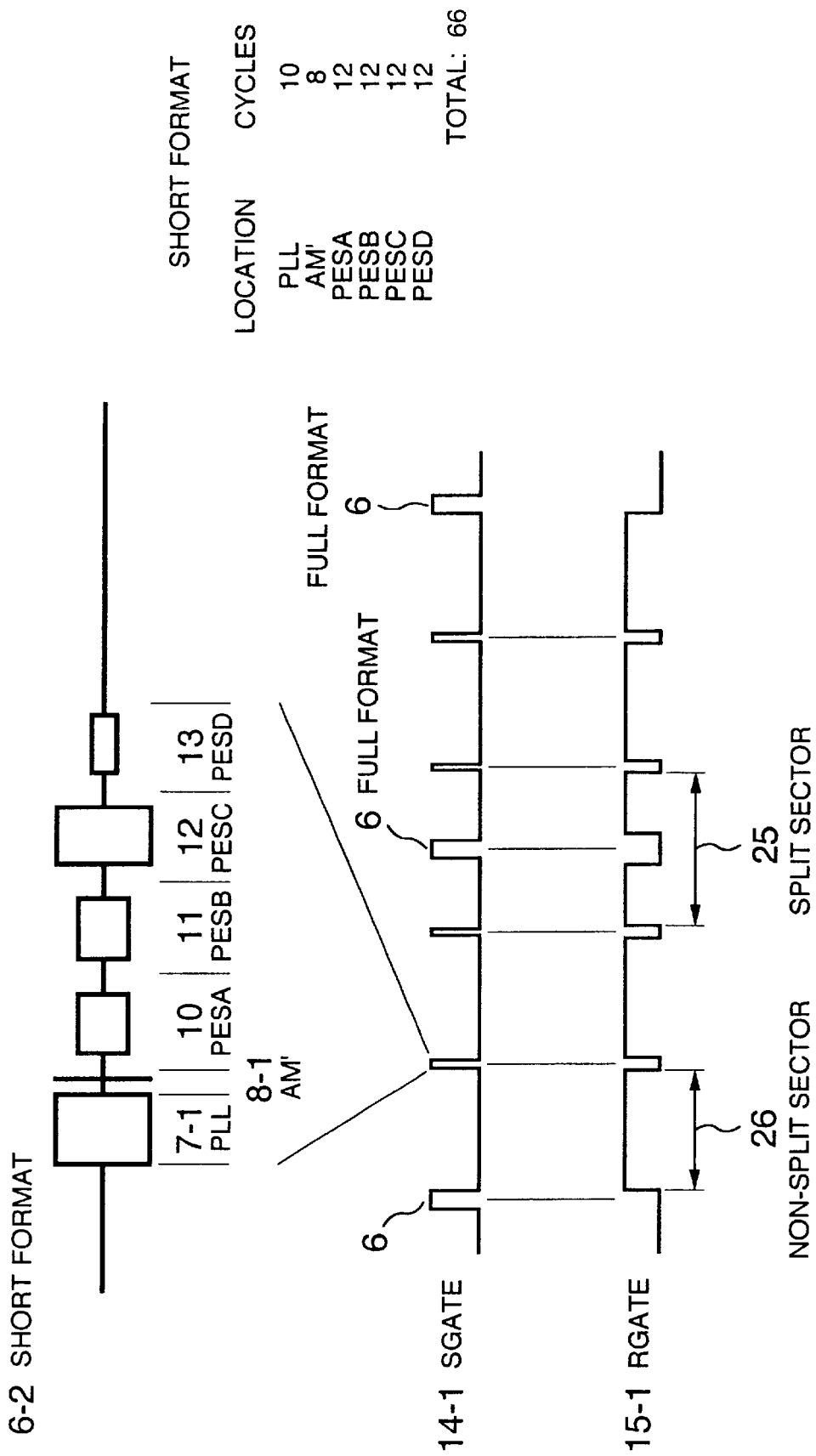
FIG. 3 is a diagram showing another example of constitution of a short format of servo sectors in the embodiment.
Figure 4:
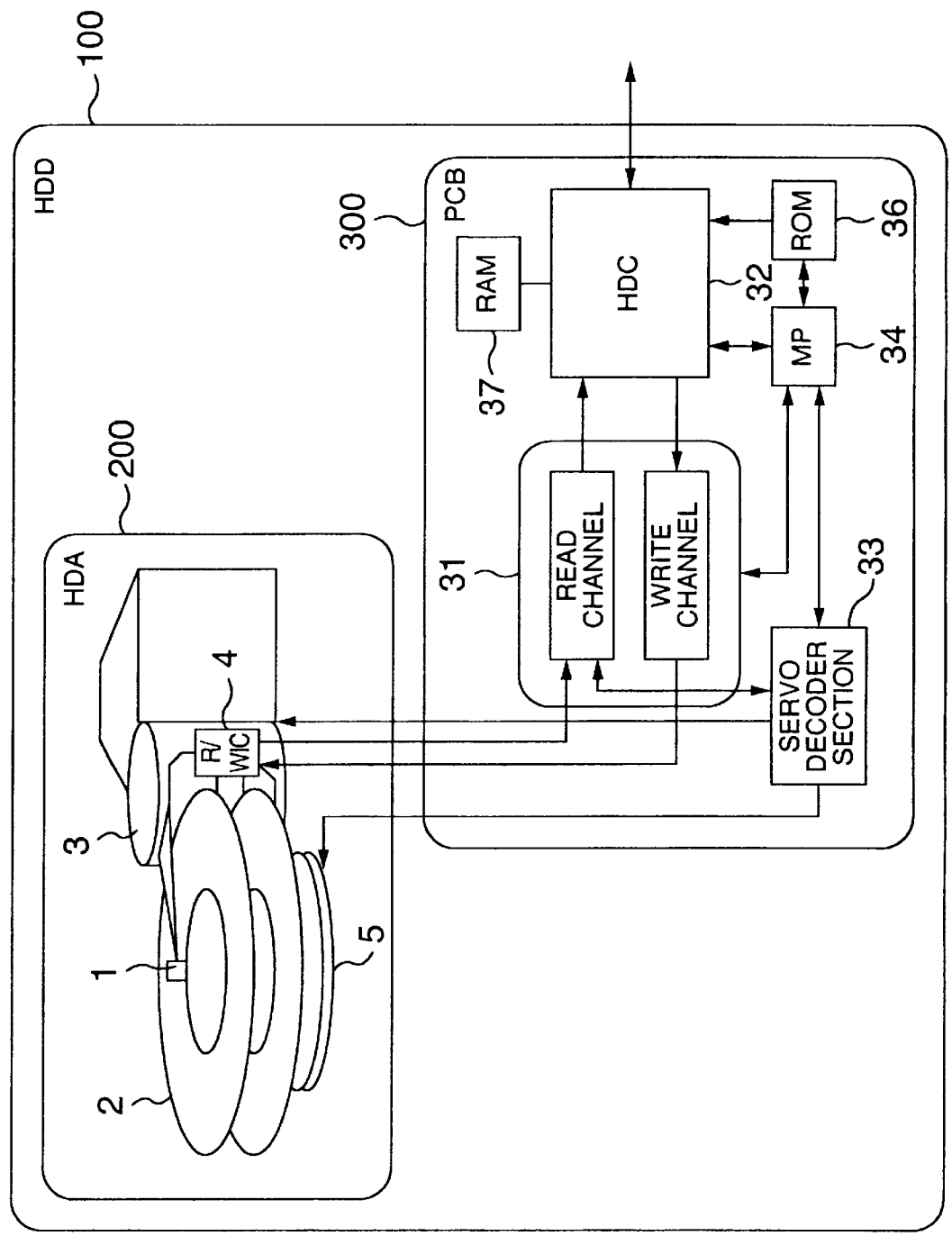
FIG. 4 is a schematic diagram showing a configuration of a magnetic disk device of the prior art.
Figure 5:
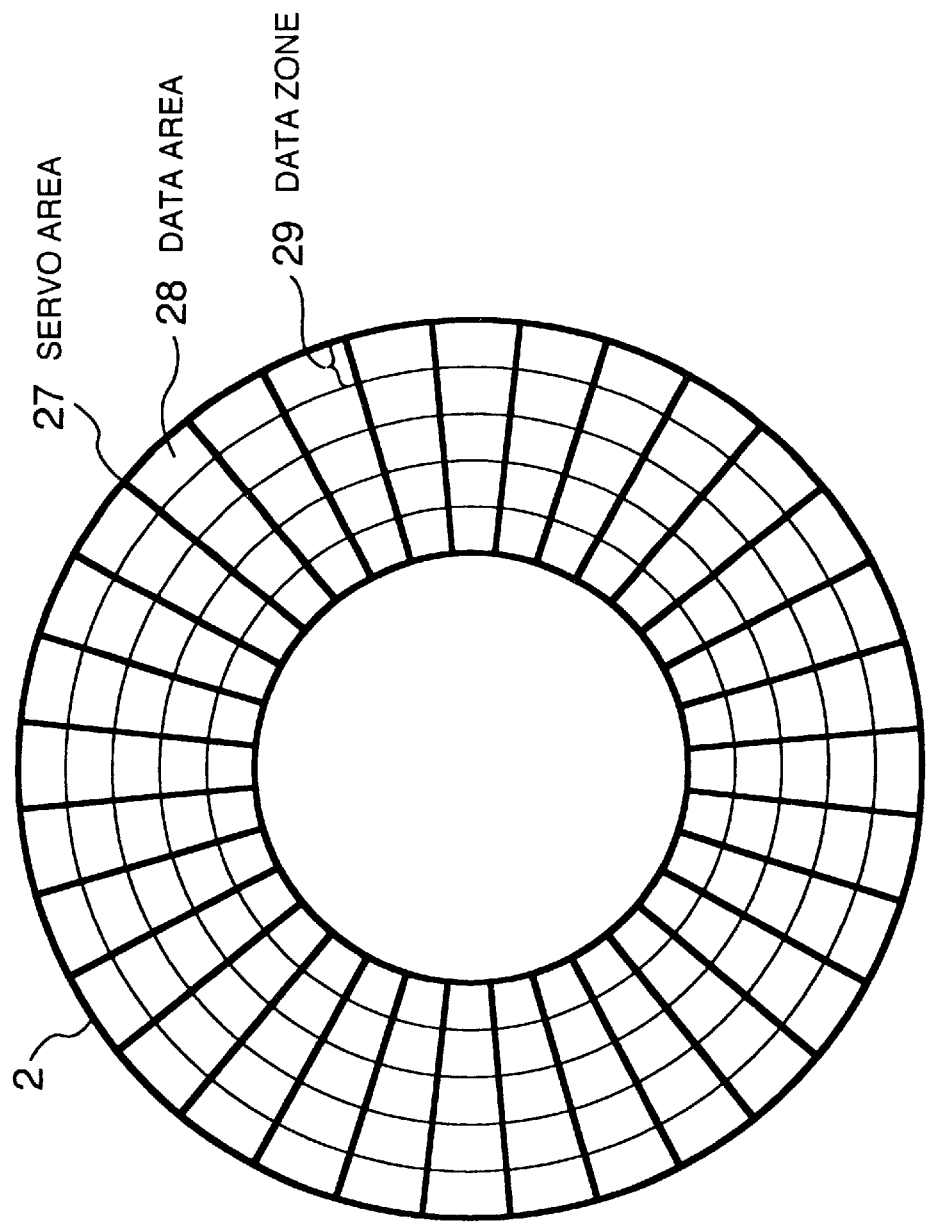
FIG. 5 is a diagram showing a layout of a magnetic disk format of the prior art.

FIG. 2 shows a mechanical section concerning magnetic disk 2 and carriage 3 and mainly the configuration of a circuit board (PCB) 300. Referring to this diagram, description will be given of a servo demodulating operation and a method of recording servo sectors of short format 6-1. In FIG. 2, various circuits assigned with a branch number to code 33 designate specific units of servo control circuit 33 shown in FIG. 4.

When magnetic disk 2 rotates and a position of full servo sector 6 approaches, a preamplifier 4 of R/W IC 4 amplifies this signal indicating the condition and outputs the signal to a read channel. Read channel 31 is then set to a servo decoding mode by SGATE 14-1 issued from a hard disk controller (HDC) 32. In a code data string 31-1 outputted from read channel, a servo mark/code detector circuit 33-1 detects an address mark, a servo sector mark, a gray code, etc. On receiving a result of the detection, a servo controller 33-3 controls a position control driver 33-5 to output a full-format servo sector mark SSP to HDC 32 and a motor control driver 33-4.

Servo controller 33-3 also outputs a control signal Sgate for the PES decoding operation to a servo PES demodulator 33-2. Servo PES demodulator 33-2 demodulates, using an AM detection signal from servo mark/code detector circuit 33-1 and SGATE signal 14-1, PESA to PESD from a sample value string 31-2 outputted from read channel 31 and outputs a result of the decoding to servo controller 33-3. Servo controller 33-3 is controlled by information in an ROM (36) and an RAM (37) in which various area lengths and position information are recorded and which are connected to a microprocessor 34.

A motor controller driver 33-4 controls a rotational speed of a magnetic disk 2. This control operation uses a full-format servo sector mark ssp and a clock sclk of a servo frequency oscillator 33-6. In this operation, information of an interval between full-format servo sectors recorded on ROM (36) is used such that a period of time associated with the count of clock sclk of servo frequency oscillator 33-6 is controlled to match the servo sector interval. The control operation may be conducted at an interval of a plurality of servo sectors.

In the head seek operation in a radial direction of magnetic disk 2, only full-format servo sectors 6 are used. This is achieved by servo controller 33-3 under a control operation of position control driver 33-5 in which controller 33-3 moves head 1 from a gray code recorded in full-format servo sector 6 to an objective track ID 9-2 while detecting track ID (TID) 9-2. Since short-format servo sector 6-1 does not include track ID 9-2, servo sector 6-1 is not demodulated in the seek operation. In this situation, information of the interval between full-format servo sectors recorded on ROM (36) and information of each area length of full-format servo sector 6 are used to detect track ID 9-2. The rotation of magnetic disk and the seek control of head 1 above are almost the same as those of the control technique of the prior art.

The embodiment of the present invention particularly conducts the following control of head 1. When a following operation is indicated by microprocessor 34, servo controller 33-3 opens Sgate at a position of short format 6 according to information of each area length of short-format servo sector 6-1 stored in RAM (37), an AM position (address mark position) which can be detected in full-format servo sector 6, servo sector address 9-1, and a data zone position. This signal sets read channel 31 to a servo modulation mode and initiates servo PES demodulator 33-2, and PES information is also demodulated from this area 6-1. Servo controller 33-3 can control position control driver 33-5 in a wide band using the PES information from full and short servo sectors 6 and 6-1.

In this situation, servo PES demodulator 33-2 and servo mark/code detector circuit 33-1 are integrally included in read channel 31, for example, in a chip form. In this case, one signal (only SGATE) indicates a servo area to discriminate a full-format servo area from a short-format servo area, and two signals SGATE and Sgate are not inputted from servo controller 33-3.

Figure 8:
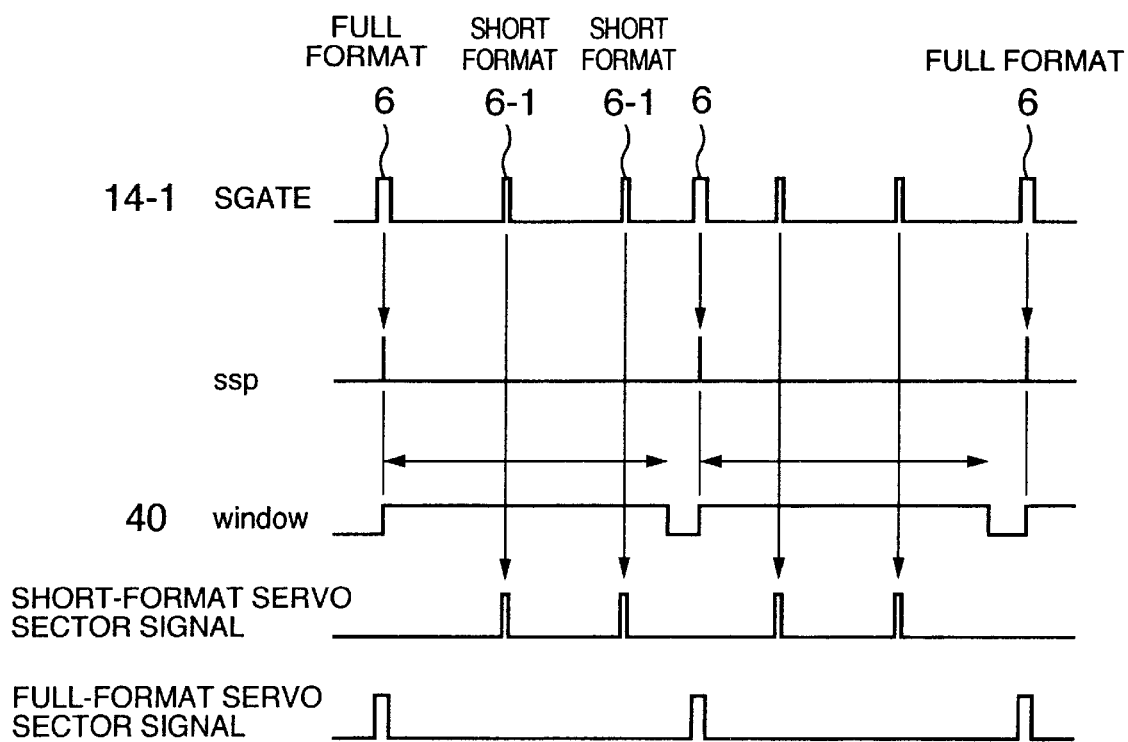
FIG. 8 is a diagram for explaining a method of recognizing a short-format servo sector in the embodiment of the present invention.

FIG. 8 shows timing of signals to apply the present invention to this configuration. That is, using the prior art, a Window 40 is configured to detect servo sector pulse ssp in full-format servo sector 6 so as to detect a short-format servo sector according to the ssp. In consideration of fluctuation in the disk rotation, Window 40 is set to be closed in any situation by when SGATE indicating the next full format rises. This configuration recognizes SGATE inputted during this Window as a short-format servo sector.

To arrange at arbitrary positions between the full-format servo sectors an arbitrary number of short-format servo sectors including only PES signals by a read channel which integrally includes servo PES demodulator 33-2 and servo mark/code detector circuit 33-1 and which includes one SGATE input, it is required to adopt the read channel having a unit to discriminate the short format as above. Naturally, by applying the read channel, it is possible to configure short-format servo sectors between the full-format servo sectors.

Short-format servo sector 6-1 is demodulated basically only during the following operation. Therefore, the four servo burst (PESA to PESD) is not necessarily required as shown in FIG. 7, and the operation can be achieved also with the two servo burst.

This embodiment can cope with not only a format of a fixed data sector length but also a change in the data sector length. In the formatting of data sectors, it is possible to format short-format servo sectors 6-1. This can be achieved such that only full-format servo sectors 6 are recorded by a servo formatting unit such as a servo writer and then short-format servo sectors 6-1 are recorded through an offset following operation in a direction of track width using information of full-format servo sectors 6.

The operation will be concretely described using FIG. 2. First, according to the contents of the data sector format in ROM (36), microprocessor 34 calculates an Sgate position and positions of PESA to PESD for each data zone/servo sector address and stores the contents resultant from the calculation in RAM (37). According to the information, head 1 is moved to an off-track position and PES writer 38 is initiated only at the Sgate position to record a servo pattern corresponding to the offset position. The system repeatedly executes this operation while conducting the off-track operation to thereby record the servo pattern of each PES. In the operation, if head 1 is of a read/write separation type, the offset amount in the track direction needs correction due to displacement of the gap position and the yaw angle.

Ordinarily, short-format servo sectors 6-1 are arranged such that a data sector is not split thereby and data sectors and also short format 6-1 are recorded by a servo writer. Therefore, the servo format set at this point determines the data sector length. However, when the short format recording method above is employed, the data sector length can be changed after the servo write operation.

FIG. 9 is a diagram to explain format improving effect of this embodiment. According to the servo/data format of FIGS. 10 and 11, the data area ratio (format efficiency) of a 10000 rpm HDD is calculated by changing the number of servo sectors and the cycle frequency (servo frequency). The data transfer rate is 30 MB/s which is equal to the value in the description of the prior art above. Data sectors can be allocated to data area 28 obtained by subtracting the servo area ratio from an area equivalent 6 msec of one circumference. The number of non-split sectors can be calculated by subtracting the total split data sector length from the area to resultantly obtain the total number of data sectors on the circumference of the magnetic disk.

The data area ratio is calculated as a ratio of the area length determined by "512-byte long user data×total number of data sectors" to the length in the circumferential direction. The ratio of AGC or the like is calculated as a ratio of 65×2=130 bytes for a split sector and 65 bytes for a non-split sector to the length in the circumferential direction. The ratio of ECC or the like is calculated as a ratio of "total number of data sectors×48 bytes" to the length in the circumferential direction.

Detailed description of Type A, Type B1, and Type B2 is similar to the description of the prior art above. Type C includes 160 servo sectors including 40 full-format servo sectors 6 necessary for the head 1 seek operation and the like, and remaining 120 short-format servo sectors 6-1. It is assumed in the full-format servo sectors 6 that 20 data sectors (50% of the total full-format servo sectors) are split. In accordance with this servo-data format, when compared with the case of Type B2, the servo area ratio and the ratio of AGC and the like are respectively improved by 0.9 point from 6.2% to 5.3% and by 3.3 points from 13.6% to 10.3%. The data area ratio (format efficiency) is improved by 2.3 points from 73.1% to 75.4%.

In accordance with this embodiment above, by using short-format servo sectors 6-1 not to split data sectors, the servo area ratio is naturally improved, the ratio of AGC and the like associated with the splitting of data sectors can be remarkably improved, and the format efficiency can be resultantly improved. The efficiency is improved even when compared with the narrow servo band of Type A and it can be understood that the servo band becomes higher and the format efficiency is improved by applying the present invention.

Although the format shown in FIG. 7 according to the prior art is applied to short-format servo sector 6-1 in the mode for carrying out the present invention, PLL acquisition area 7-1 and address mark (AM') 8-1 may be disposed before the PES area. When the clock phase in read channel 31 is determined in PLL area 7-1 to detect AM' 8-1 to determine internal gates of PESA 10 to PESD 13 according to AM' 8-1, the gate timing margin caused by fluctuation in the disk rotation or the like can be considerably lowered and each areas of PESA 10 to PESD 13 can be minimized.

As can be understood from the embodiment, by using a configuration in which short-format servo sectors 6-1 do not split data sectors and the number of short-format servo sectors is equal to or more than one half of the total number of servo sectors, it is possible to widen the servo band and to improve the format efficiency.

In addition, by applying a magnetic disk device in accordance with to the present invention, there can be implemented a portable device which uses vibration for its operation and which can cope with an environment with strong vibration and shock as well as a highly reliable data server which operates without performance loss.

As above, the embodiment of the present invention includes the following configuration to achieve functions and operations as follows.

First, in accordance with the present invention, the servo and data formats of a magnetic disk device include servo sectors of a full format successively arranged in a radial direction of a magnetic disk (not arranged in one direct line), and a data sector is not split by the servo sector. This makes it possible to reduce additional areas caused by splitting data sectors and to improve data format efficiency.

Second, the servo and data formats of the first configuration include a servo format having a plurality of recording lengths. This can further reduces the servo areas.

Third, there are included servo sectors of a full format successively arranged in a radial direction of a magnetic disk and servo sectors of a short format which interpolate those of the full format and which are not successively arranged in a radial direction of the magnetic disk, and a data sector is not split at least by the servo sector of the short format.

Fourth, in a magnetic disk device having a servo format of the first to third configurations, a gap of at least one track is disposed between zones arranged on the magnetic disk in a radial direction thereof. This prevents deterioration of servo burst information even when the short-format servo sectors are not successively arranged in the radial direction.

Fifth, in a magnetic disk device having a plurality of servo formats, short-format servo sectors are not successive between data zones arranged on the magnetic disk in a radial direction thereof.

Sixth, during a seek operation between data tracks, only full-format servo sectors successively arranged in a radial direction of a magnetic disk are decoded, and during a following operation, also short-format servo sectors not successively arranged in a radial direction of the magnetic disk are demodulated. This facilitates sequence control in a seek operation between data tracks.

Seventh, there are included a unit for recording servo sectors of a full format successively arranged in a radial direction of a magnetic disk and a unit for recording complementary servo sectors according to information of the full format servo sectors recorded. This allows a user to insert short-format servo sectors in a user site according to the full-format servo sectors formatted in a factory, and hence a variable data format can be handled.

Eighth, there are included servo sectors not successively arranged in a radial direction, and the servo sectors have a plurality of servo formats. This prevents all data sectors from being recorded in a split state, and hence format efficiency is further improved.

Ninth, a signal processing circuit of a magnetic disk device which includes a demodulating unit for track information and position error signals and which includes one input of a servo control signal indicating a servo area includes a full-format sector detecting unit for detecting, from a full-format servo sector including track information, that the sector is a full-format servo sector and an area creating unit for configuring an area to detect a short-format servo sector including position error signals according to a result of the detection of the full-format sector detecting unit. The processing circuit recognizes a servo control signal inputted during the output operation of the area creating unit as a short-format servo sector. This enables detection of a short-format servo sector existing at an arbitrary position between the full-format servo sectors, and hence the degree of freedom of the device format is increased.

Tenth, by the signal processing circuit of the ninth configuration, an arbitrary number of short-format servo sectors including position error signals are arranged at arbitrary positions between the full-format servo sectors including track information. This makes it possible to implement, by minimizing the lowing of format efficiency, a magnetic disk device having wide-band servo control.

In accordance with the present invention, there can be provided a magnetic disk device which has a wide tracking servo band and high head positioning performance and which develops high data format efficiency.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A servo control method for a storage media, comprising the steps of:
   arranging a plurality of servo sectors along a circumferential direction of the disk-type storage medium without successively arranging the plurality of servo sectors in a radial direction; and
   arranging a plurality of data sectors which are not split by the servo sectors.

2. A servo control method in accordance with claim 1, further comprising the steps of:
   not successively arranging a plurality of servo sectors arranged in the radial direction; and
   successively arranging a plurality of servo sectors in the radial direction.

3. A servo control method in accordance with claim 2, wherein:
   the plurality of servo sectors not successively arranged in the radial direction include servo sectors of a short format which include position error signals; and
   the plurality of servo sectors successively arranged in the radial direction includes servo sectors of a full format which include track information.

4. A servo control method in accordance with claim 3, wherein short-format servo signals are obtained from the short-format servo sectors and full-format servo signals from the full-format servo sectors, more than two of the short-format servo signals appearing next to the full-format servo signal.

5. A servo control method in accordance with claim 3, further comprising the step of arranging a plurality of short-format servo sectors between the full-format servo sectors.

6. A servo control method in accordance with claim 3, wherein the short-format servo sectors include a plurality of servo formats having different recording lengths.

7. A servo control method in accordance with claim 3, including providing a plurality of data zones configured by subdividing the storage media in a direction from an internal circumference of the disk to an outer circumference thereof, each zone having one data transfer rate.

8. A servo control method in accordance with claim 1, further comprising the step of providing a gap of at least one track between data zones configured by subdividing the disk-type storage media in a direction from an internal circumference of the disk to an outer circumference thereof.

9. A servo control method in accordance with claim 1, wherein the disk-type storage media is a magnetic disk.

10. A servo control method for storage, comprising the steps of:

providing a head disk assembly including a disk-type storage media having short-format servo sectors recorded thereon including position error signals and full-format servo sectors recorded thereon including track information, and data recorded thereon;

providing a head which reads the servo sector from the disk-type storage media and which conducts input/output operations of the data to/from the disk-type storage media;

providing an integrated circuit (IC) for transferring data between the head and the storage media;

providing a channel for controlling input/output operations to/from the head disk assembly;

providing a controller for setting a mode of the channel to a servo sector read mode or to a data input/output mode;

providing a servo controller for demodulating the servo sectors of formats recorded on the storage media; and controlling the servo controller and the channel with a microprocessor so that only the full-format servo sectors are decoded during a seek operation of the head and only the short-format servo sectors are demodulated during a following operation of the head.

11. A servo control method in accordance with claim 10, wherein the full-format servo sectors are decoded by detecting the track information.

12. A servo control method in accordance with claim 10, wherein the short-format servo sectors are demodulated by detecting a servo sector of the short format according to detection of a servo sector pulse in the full-format servo sector.

13. A servo control method in accordance with claim 10, wherein more than two short-format servo signals appear next to the full-format servo signal.

14. A servo control method in accordance with claim 11, wherein more than two short-format servo signals appear next to the full-format servo signal.

15. A servo control method in accordance with claim 12, wherein more than two short-format servo signals appear next to the full-format servo signal.

* * * * *